(12) United States Patent
Moganty et al.

(10) Patent No.: US 11,876,181 B2
(45) Date of Patent: Jan. 16, 2024

(54) LITHIUM ION BATTERY ELECTROLYTE ADDITIVE

(71) Applicant: NOHMS Technologies, Inc., Rochester, NY (US)

(72) Inventors: Surya S. Moganty, Henrietta, NY (US); Rutvik Vaidya, Rochester, NY (US); Xiaojing Zhu, Rochester, NY (US); Yue Wu, Rochester, NY (US); John Sinicropi, Rochester, NY (US); Gabriel Torres, Rochester, NY (US)

(73) Assignee: NOHMS Technologies, Inc., Rochester, NY (US)

( * ) Notice: Subject to any disclaimer, the term of this patent is extended or adjusted under 35 U.S.C. 154(b) by 124 days.

(21) Appl. No.: 17/335,551

(22) Filed: Jun. 1, 2021

(65) Prior Publication Data

US 2021/0376382 A1 Dec. 2, 2021

Related U.S. Application Data

(60) Provisional application No. 63/032,977, filed on Jun. 1, 2020.

(51) Int. Cl.
| | |
|---|---|
| *H01M 10/05* | (2010.01) |
| *H01M 10/0567* | (2010.01) |
| *H01M 10/0525* | (2010.01) |
| *H01M 10/0568* | (2010.01) |
| *H01M 4/38* | (2006.01) |
| *H01M 50/491* | (2021.01) |
| *H01M 10/0569* | (2010.01) |

(52) U.S. Cl.
CPC ....... *H01M 10/0567* (2013.01); *H01M 4/386* (2013.01); *H01M 10/0525* (2013.01); *H01M 10/0568* (2013.01); *H01M 10/0569* (2013.01); *H01M 50/491* (2021.01); *H01M 2300/0028* (2013.01)

(58) Field of Classification Search
CPC ......... H01M 10/0567; H01M 10/0525; H01M 10/052; H01M 10/0568; H01M 10/0569; H01M 4/386; H01M 50/491; H01M 2300/0028
See application file for complete search history.

(56) References Cited

U.S. PATENT DOCUMENTS

| | | | |
|---|---|---|---|
| 10,665,899 B2 | 5/2020 | Moganty et al. | |
| 2017/0288219 A1 | 10/2017 | Hirose et al. | |
| 2018/0145372 A1 | 5/2018 | Qiao et al. | |
| 2020/0235421 A1* | 7/2020 | Zhou | H01M 10/0562 |
| 2021/0320327 A1* | 10/2021 | Ouspenski | H01M 10/0525 |
| 2021/0336291 A1* | 10/2021 | Nanda | H01M 10/0525 |

OTHER PUBLICATIONS

PubChem CID 101396181 (create date Dec. 18, 2015).
International Search Report and Written Opinion for International Patent Application No. PCT/US2021/035162 (dated Sep. 20, 2021).

* cited by examiner

*Primary Examiner* — Raymond Alejandro
(74) *Attorney, Agent, or Firm* — BOND, SCHOENECK & KING, PLLC; Joseph Noto

(57) ABSTRACT

The present disclosure relates to a phosphorus additive that is useful for stable cycling and storage of lithium ion cells at high temperatures, an electrolyte containing the phosphorus additive, and an electrochemical energy storage device containing the electrolyte. An electrolyte includes an aprotic organic solvent system; a metal salt; and at least one thiophosphate additive having a nitrile terminal group, according to the formula:

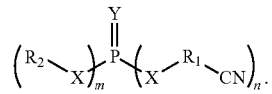

34 Claims, 2 Drawing Sheets

LITHIUM ION BATTERY ELECTROLYTE ADDITIVE

CROSS REFERENCE

This application claims the benefit of the filing date of U.S. Provisional Patent Application No. 63/032,977, filed Jun. 1, 2020, which is hereby incorporated by reference in its entirety.

FIELD

The present disclosure relates to a thiophosphate additive having a nitrile terminal group that is useful for stable cycling of Li-ion cells at high temperatures, an electrolyte containing the nitrile-substituted thiophosphate additive, and an electrochemical energy storage device containing the electrolyte.

BACKGROUND

Li-ion batteries are heavily used in consumer electronics, electric vehicles (EVs), as well as energy storage systems (ESS) and smart grids. Recently, Li-ion batteries with voltages above 4.2 V have gained importance because of higher capacity and subsequently energy density benefits. However, the stability of the cathode materials at these potentials reduces due to increased electrolyte oxidation. This may result in electrochemical oxidation of the material to produce gases, and that can deteriorate the performance of the battery. The cathode active material, which is capable of intercalating/deintercalating lithium ions may dissolve in the non-aqueous electrolyte, resulting in a structural breakdown of the cathode, and will lead to an increase in the interfacial resistance. These Li-ion batteries are also typically exposed to extreme temperatures during their operation. The SEI (Solid Electrolyte Interface) layer formed on the anode is gradually broken down at high temperatures, and hence leads to more irreversible reaction resulting in capacity loss. These reactions happen on the positive and negative electrode during cycling but are generally more severe at higher temperatures due to faster kinetics. The next generation Li-ion batteries used in consumer electronics, EVs, and ESS will require significant improvements in the electrolyte component relative to the current state-of-the art of Li-ion batteries.

The shuttling of positive and negative ions between the battery electrodes is the main function of the electrolyte. Historically, researchers have focused on developing battery electrodes, and electrolyte development has been limited. Traditional Li-ion batteries used carbonate-based electrolytes with a large electrochemical window, that can transport lithium ions. These electrolytes need functional additives to passivate the anode and form a stable SEI layer. At the same time, there is a need to design and develop additives that allow stable and safe cycling of high voltage Li-ion batteries at high temperatures.

As the industry moves towards higher energy cathode materials for higher energy batteries, stable, efficient, and safe cycling of batteries in wide voltage windows is necessary. Li-ion battery electrolytes can be tuned based on their applications by addition of different co-solvents and additives. This tunability has enabled the development of different additives for high voltage stability and safety of Li-ion cells. Another aspect of high-voltage Li-ion battery electrolyte development is design and optimization of additives for stable cycling at elevated temperatures, as batteries today have a variety of applications where the cell is exposed to different temperature and pressure conditions. Development of such additives can also lead to reduced gas generation at elevated temperatures, and therefore improving the high temperature storage characteristics of Li-ion cells.

U.S. Pat. Nos. 9,437,901 B2, 9,847,549 B2 and 9,660,295 B2 to Samsung SDI teach the use of select nitrile substituted phosphates for lithium battery electrolytes. Hence, there is a need to incorporate novel additives to improve the performance of lithium batteries.

SUMMARY

In accordance with one aspect of the present disclosure, there is provided an electrolyte for an electrochemical energy storage device, the electrolyte includes: a nitrile-substituted thiophosphate additive; an aprotic organic solvent system; a metal salt; and at least one additional additive.

In accordance with another aspect of the present disclosure, there is provided an electrolyte for an electrochemical energy storage device, the electrolyte includes: a nitrile-substituted thiophosphate additive; an aprotic organic solvent system; a metal salt; and at least one additional additive; wherein the nitrile-substituted thiophosphate additive has at least one phosphorous and one sulfur moiety.

In accordance with another aspect of the present disclosure, there is provided an electrolyte for an electrochemical energy storage device, the electrolyte includes: a nitrile-substituted thiophosphate additive; an aprotic organic solvent system; a metal salt; and a second additive; wherein the aprotic organic solvent comprises of open-chain or cyclic carbonate, carboxylic acid ester, nitrite, ether, sulfone, sulfoxide, ketone, lactone, dioxolane, glyme, crown ether, siloxane, phosphoric acid ester, phosphite, mono- or polyphosphazene or mixtures thereof.

In accordance with another aspect of the present disclosure, there is provided an electrolyte for an electrochemical energy storage device, the electrolyte includes: a nitrile-substituted thiophosphate additive; an aprotic organic solvent; a metal salt; and at least one additional additive; wherein the cation of the metal salt is aluminum, magnesium or an alkali metal, such as lithium or sodium.

In accordance with another aspect of the present disclosure, there is provided an electrolyte for an electrochemical energy storage device, the electrolyte includes: a nitrile-based compound additive; an aprotic organic solvent; a metal salt; and at least one additional additive; wherein the at least one additional additive contains a compound containing at least one unsaturated carbon-carbon bond, carboxylic acid anhydrides, sulfur-containing compounds, phosphorus-containing compounds, boron-containing compounds, silicon-containing compounds or mixtures thereof.

In accordance with another aspect of the present disclosure, there is provided an electrochemical energy storage device electrolyte including:
a) an aprotic organic solvent system;
b) a metal salt; and
c) at least one thiophosphate additive having a nitrile terminal group, according to the formula:

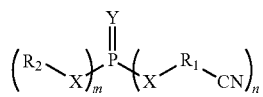

wherein:
Y is oxygen or sulfur;
X is independently oxygen or sulfur, with the proviso that if Y is oxygen then at least one X is sulfur;
m and n are either 0, 1, 2 or 3; but m and n must sum equal to 3;
$R_1$ and $R_2$ are independently a $C_1$-$C_{10}$ substituted or unsubstituted alkyl group, or aryl group; wherein the hydrogen atoms can be unsubstituted or can be a halogen, alkyl, alkoxy, perfluorinated alkyl, silyl, siloxy, silane, sulfoxide, amide, azo, ether, and thioether group or combinations thereof.

In accordance with another aspect of the present disclosure, there is provided an electrochemical energy storage device including: a cathode; an anode; an electrolyte according to the present disclosure; and a separator.

DETAILED DESCRIPTION

Figure 1:
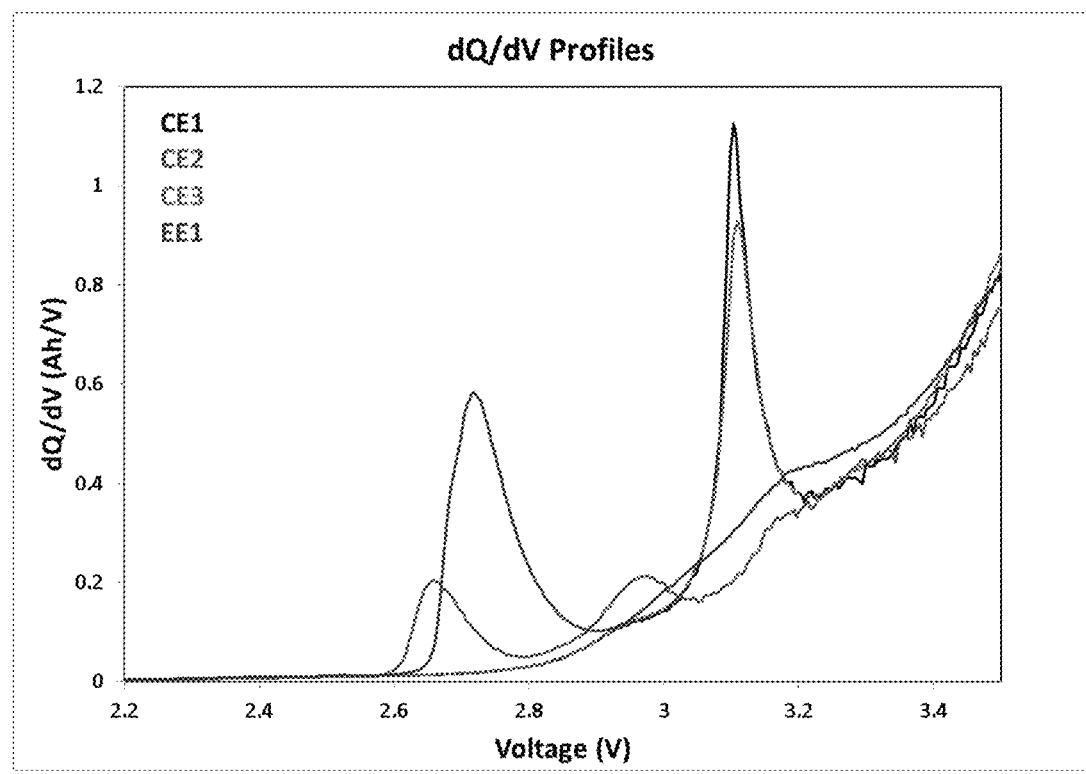
FIG. 1 shows the dQ/dV profiles of electrolytes tested in LCO-Gr cells.

The disclosed technology relates generally to lithium-ion (Li-ion) battery electrolytes. Particularly, the disclosure is directed towards nitrile-substituted thiophosphate additives, electrolytes containing the nitrile-substituted thiophosphates, and electrochemical energy storage devices containing the electrolytes. Herein, thiophosphate ester compounds with nitrile groups are reported as additives for Li-ion batteries. Molecules with the said functional groups as electrolyte additives allow for safe and stable operation of Li-ion cells, particularly at elevated temperatures. The nitrile-substituted thiophosphates have high solubility in organic solvents. The electrolyte with these nitrile-based additives have high ionic conductivity and are suitable for use as electrolytes for electrochemical devices, particularly lithium ion batteries.

The present disclosure describes a Li-ion battery electrolyte with an electrolyte additive that can overcome high temperature stability challenges in Li-ion batteries, particularly those operated at high-voltages. Current state-of-the-art Li-ion battery electrolytes are tuned towards room temperature application, and researchers have recently started focusing on the safety of the battery by using safe co-solvents and additives. There is a need to develop an electrolyte solution for cycling of Li-ion cells with high voltage cathodes at elevated temperatures. The proposed technology is based on an innovative electrolyte additive containing a nitrile group, that can improve the stability of high-voltage cathode during high-temperature operation. The electrolyte additives form a unique solid electrolyte interface (SEI) and do not excessively passivate the anode, when used at low weight loadings. Additionally, the room temperature performance of the batteries is not affected by using the additive.

In an embodiment, an electrochemical energy storage device electrolyte includes a) an aprotic organic solvent system; b) a metal salt; c) a nitrile-substituted thiophosphate and d) at least one additional additive.

In an embodiment of the disclosure, suitable molecular structures of the nitrile-substituted thiophosphate are depicted below:

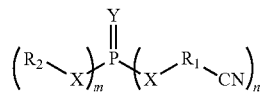

wherein:
Y is oxygen or sulfur;
X is independently oxygen or sulfur, with the proviso that if Y is oxygen then at least one X is sulfur;
m and n are either 0, 1, 2 or 3; but m and n must sum equal to 3;
$R_1$ and $R_2$ are independently a $C_1$-$C_{10}$ substituted or unsubstituted alkyl group, or aryl group; wherein the hydrogen atoms can be unsubstituted or can be a halogen, alkyl, alkoxy, perfluorinated alkyl, silyl, siloxy, silane, sulfoxide, amide, azo, ether, and thioether group or combinations thereof.

The lone pair of electrons from nitrogen in the CN group bonds with the transition metals (Ni, Co, Mn) of the cathode surface. This leads to the formation of a surface film and the contact of the solvent of cathode and electrolyte is interrupted, thus suppressing the oxidation degradation of the solvent. Higher coordination between CN and the transition metal increases the strength of the bond between metal and nitrogen lone pair, inhibiting the dissolution of the transition metal, and hence the degradation of NCM-based cathodes at high-temperature can be prevented.

In another embodiment, an electrolyte is provided and includes a mono or poly nitrile group compound, wherein the nitrile group is a pendant group attached to a backbone, wherein the backbone is at least one of thiophosphate ester compound, a triazene molecule, a phosphazene molecule, and an ionic liquid with cationic moieties selected from a nitrogen cation moiety, a phosphorous cation moiety, and a sulfur cation moiety.

In another embodiment, the nitrile compound is attached to a backbone selected from at least one of thiophosphate, triazene, phosphazene, and an ionic liquid with cationic moieties selected from a nitrogen cation moiety, a phosphorous cation moiety, and a sulfur cation moiety.

In another embodiment, the anion in case of a nitrile based ionic liquid in accordance with the present disclosure include but are not limited to halides (e.g., Cl, Br), nitrates (e.g., NO 3), phosphates (e.g., $PF_6$, TFOP), imides (e.g., TFSI, BETI), borates (e.g., BOB, $BF_4$), aluminates, arsenides, cyanides, thiocyanates, nitrites, benzoates, carbonates, chlorates, chlorites, chromates, sulfates, sulfites, silicates, thiosulfates, or hydroxides.

In another embodiment, the nitrile-substituted thiophosphate additive is present in the electrolyte in a range of from 0.001% to 25% by weight.

The disclosure also includes a method for synthesizing the nitrile-substituted thiophosphate molecules, and the use of such molecules in lithium ion battery electrolytes. These molecules impart greater stability to the electrolytes at higher operating temperatures.

In an aspect of the disclosure, the electrolyte further includes a lithium salt in a range of from 10% to 30% by weight. A variety of lithium salts may be used, including, for example, $Li(AsF_6)$; $Li(PF_6)$; $Li(CF_3CO_2)$; $Li(C_2F_5CO_2)$; $Li(CF_3SO_3)$; $Li[N(CP_3SO_2)_2]$; $Li[C(CF_3SO_2)_3]$; $Li[N(SO_2C_2F_5)_2]$; $Li(ClO_4)$; $Li(BF_4)$; $Li(PO_2F_2)$; $Li[PF_2(C_2O_4)_2]$; $Li[PF_4C_2O_4]$; lithium alkyl fluorophosphates; $Li[B(C_2O_4)_2]$; $Li[BF_2C_2O_4]$; $Li_2[B_{12}Z_{12-j}H_j]$; $Li_2[B10X_{10-j}H_j]$; or a mixture of any two or more thereof, wherein Z is independent at each occurrence a halogen, j is an integer from 0 to 12 and j' is an integer from 1 to 10.

In an aspect of the disclosure, the electrolyte further includes an aprotic organic solvent system selected from open-chain or cyclic carbonate, carboxylic acid ester, nitrite, ether, sulfone, sulfoxide, ketone, lactone, dioxolane, glyme, crown ether, siloxane, phosphoric acid ester, phosphite, mono- or polyphosphazene or mixtures thereof in a range of from 80% to 90% by weight.

Examples of aprotic solvents for generating electrolytes include but are not limited to dimethyl carbonate, ethyl methyl carbonate, diethyl carbonate, methyl propyl carbonate, ethyl propyl carbonate, dipropyl carbonate, propylene carbonate, ethylene carbonate, fluoroethylene carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, methyl propionate, ethyl propionate, butyl propionate, dimethoxyethane, triglyme, dimethylvinylene carbonate, tetraethyleneglycol, dimethyl ether, polyethylene glycols, triphenyl phosphate, tributyl phosphate, hexafluorocyclotriphosphazene, 2-Ethoxy-2,4,4,6,6-pentafluoro-1,3,5,2-5,4-5,6-5 triazatriphosphinine, triphenyl phosphite, sulfolane, dimethyl sulfoxide, ethyl methyl sulfone, ethylvinyl sulfone, allyl methyl sulfone, divinyl sulfone, fluorophenylmethyl sulfone and gamma-butyrolactone.

In an embodiment of the disclosure, the electrolytes further include at least one additional additive to protect the electrodes and electrolyte from degradation. Thus, electrolytes of the present technology may include an additive that is reduced or polymerized on the surface of an electrode to form a passivation film on the surface of the electrode. In some embodiments, electrolytes of the present technology further include mixtures of the two types of additives.

In an embodiment, an additive is a substituted or unsubstituted linear, branched, or cyclic hydrocarbon including at least one oxygen atom and at least one aryl, alkenyl or alkynyl group. The passivating film formed from such additives may also be formed from a substituted aryl compound or a substituted or unsubstituted heteroaryl compound where the additive includes at least one oxygen atom.

Representative additives include glyoxal bis(diallyl acetal), tetra(ethylene glycol) divinyl ether, 1,3,5-triallyl-1,3,5-triazine-2,4,6(1H,31-1,5H)-trione, 1,3,5,7-tetravinyl-1,3,5,7-tetramethylcyclotetrasiloxane, 2,4,6-triallyloxy-1,3,5-triazine, 1,3,5-triacryloylhexahydro-1,3,5-triazine, 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2-amino-3-vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3 vinylaziridin-2-one, 3-vinylcyclobutanone, 3-vinylcyclopentanone, 3-vinyloxaziridine, 3-vinyloxetane, 3-vinylpyrrolidin-2-one, 2-vinyl-1,3-dioxolane, acrolein diethyl acetal, acrolein dimethyl acetal, 4,4-divinyl-3-dioxolan-2-one, 4-vinyltetrahydropyran, 5-vinylpiperidin-3-one, allylglycidyl ether, butadiene monoxide, butyl-vinyl-ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, P-vinylmbutyrolactone or a mixture of any two or more thereof. In some embodiments, the additive may be a cyclotriphosphazene that is substituted with F, alkyloxy, alkenyloxy, aryloxy, methoxy, allyloxy groups or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)cyclotriphosphazene or (diaryloxy)(trifluoro)(methoxy)cyclotriphosphazene compounds or a mixture of two or more such compounds.

In some embodiments the additive is a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or the mixtures thereof. In some embodiments, the additive is vinyl carbonate, vinyl ethylene carbonate, or a mixture of any two or more such compounds. Further, the said additive is present in a range of from 0.01% to 10% by weight.

In some embodiments the additive is a fully or partially halogenated phosphoric acid ester compound, an ionic liquid, or mixtures thereof. The halogenated phosphoric acid ester may include 4-fluorophenyldiphenylphosphate, 3,5-difluorophenyldiphenylphosphate, 4-chlorophenyldiphenylphosphate, trifluorophenylphosphate, heptafluorobutyldiphenylphosphate, trifluoroethyldiphenylphosphate, bis(trifluoroethyl)phenylphosphate, and phenylbis(trifluoroethyl)phosphate. The ionic liquids may include tris(N-ethyl-N-methylpyrrolidinium)thiophosphate bis(trifluoromethylsulfonyl)imide, tris(N-ethyl-N-methylpyrrolidinium) phosphate bis(trifluoromethylsulfonyl)imide, tris(N-ethyl-N-methylpiperidinium)thiophosphate bis(trifluoromethylsulfonyl)imide, tris(N-ethyl-N-methylpiperidinium)phosphate bis(trifluoromethylsulfonyl)imide, N-methyl-trimethylsilylpyrrolidinium bis(trifluoromethylsulfonyl)imide, N-methyl-trimethylsilylpyrrolidinium hexafluorophosphate. Further, the additive is present in a range of from 0.01% to 10% by weight.

In another embodiment of the disclosure, an electrochemical energy storage device is provided that includes a cathode, an anode and an electrolyte including an ionic liquid as described herein. In one embodiment, the electrochemical energy storage device is a lithium secondary battery. In some embodiments, the secondary battery is a lithium battery, a lithium-ion battery, a lithium-sulfur battery, a lithium-air battery, a sodium ion battery, or a magnesium battery. In some embodiments, the electrochemical energy storage device is an electrochemical cell, such as a capacitor. In some embodiments, the capacitor is an asymmetric capacitor or supercapacitor. In some embodiments, the electrochemical cell is a primary cell. In some embodiments, the primary cell is a lithium/$MnO_2$ battery or Li/poly (carbon monofluoride) battery. In some embodiments, the electrochemical energy storage device is a solar cell.

In an embodiment, a secondary battery is provided including a positive and a negative electrode separated from each other using a porous separator and the electrolyte described herein.

Suitable cathodes include those such as, but not limited to, a lithium metal oxide, spinel, olivine, carbon-coated olivine, $LiFePO_4$, $LiCoO_2$, $LiNiO_2$, $LiMn_{0.5}Ni_{0.5}O_2$, $LiMn_{0.3}Co_{0.3}Ni_{0.3}O_2$, $LiMn_2O_4$, $LiFeO_2$, $LiNi_xCo_yMet_zO_2$, $A_nB_2(XO_4)_3$ (NASICON), vanadium oxide, lithium peroxide, sulfur, polysulfide, a lithium carbon monofluoride (also known as $LiCF_x$) or mixtures of any two or more thereof, where Met is Al, Mg, Ti, B, Ga, Si, Mn or Co; A is Li, Ag, Cu, Na, Mn, Fe, Co, Ni, Cu or Zn; B is Ti, V, Cr, Fe or Zr; X is P, S, Si, W or Mo; and wherein $0 \le x \le 0.3$, $0 \le y \le 0.5$, and $0 \le z \le 0.5$ and $0 \le n' \le 0.3$. According to some embodiments, the spinel is a spinel manganese oxide with the formula of $Li_{1+x}Mn_{2-z}Met'''_yO_{4-m}X'_n$, wherein Met''' is Al, Mg, Ti, B, Ga, Si, Ni or Co; X' is S or F; and wherein $0 \le x \le 0.3$, $0 \le y \le 0.5$, $0 \le z \le 0.5$, $0 \le m \le 0.5$ and $0 \le n \le 0.5$. In other embodiments, the olivine has a formula of $Li_{1+x}Fe_{1-z}Met''_yPO_{4-m}X'_n$, wherein Met'' is Al, Mg, Ti, B, Ga, Si, Ni, Mn or Co; X' is S or F; and wherein $0 \le x \le 0.3$, $0 \le y \le 0.5$, $0 \le z \le 0.5$, $0 \le m \le 0.5$ and $0 \le n \le 0.5$.

Suitable anodes include those such as lithium metal, graphitic materials, amorphous carbon, carbon nanotubes, $Li_4Ti_5O_{12}$, tin alloys, silicon, silicon alloys, intermetallic compounds, or mixtures of any two or more such materials. Suitable graphitic materials include natural graphite, artificial graphite, graphitized meso-carbon microbeads (MCMB) and graphite fibers, as well as any amorphous carbon materials.

In some embodiments, the anode is a composite anode including active materials such as silicon, silicon alloys; and a conductive polymer coating around the particles of the active material. The plurality of active material may be silicon particles having a particle size of between about 1 nm and about 100 Other active materials can include but are not limited to hard-carbon, graphite, tin, and germanium particles. The polymer can be cyclized using heat treatment at temperatures of 200 to 400° C. and convert to a ladder compound by crosslinking polymer chains. Specific polymers include but are not limited to polyacrylonitrile (PAN) where the cyclization changes the nitrile bond (C≡N) to a double bond (C=N). Polymer binder forms elastic but robust films to allow for controlled fragmentation/pulverization of silicon particles within the binder matrix. The resultant anode material can overcome expansion and conductivity challenges of silicon-based anodes, such as by providing binders that can prevent expansion of silicon particles and conductive additives to provide a path for Li-ion mobility. In some embodiments, the polymer is about 10-40 wt. % of the anode composite material.

In some embodiments, the anode and cathode electrodes are separated from each other by a porous separator.

The separator for the lithium battery often is a microporous polymer film. Examples of polymers for forming films include polypropylene, polyethylene, nylon, cellulose, nitrocellulose, polysulfone, polyacrylonitrile, polyvinylidene fluoride, polybutene, or copolymers or blends of any two or more such polymers. In some instances, the separator is an electron beam-treated micro-porous polyolefin separator. The electron treatment can increase the deformation temperature of the separator and can accordingly enhance thermal stability at high temperatures. Additionally, or alternatively, the separator can be a shut-down separator. The shut-down separator can have a trigger temperature above about 130° C. to permit the electrochemical cells to operate at temperatures up to about 130° C.

The following molecular structures are examples of suitable nitrile-substituted thiophosphates:

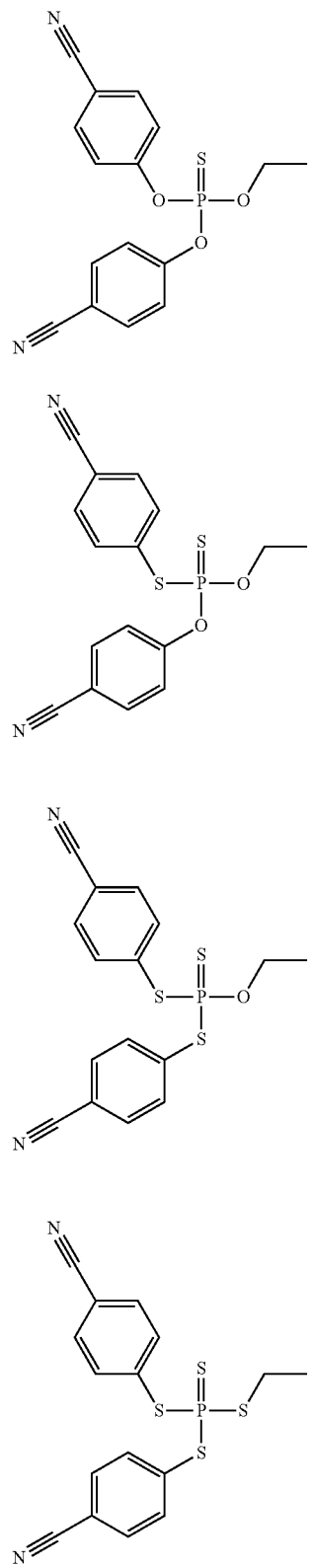

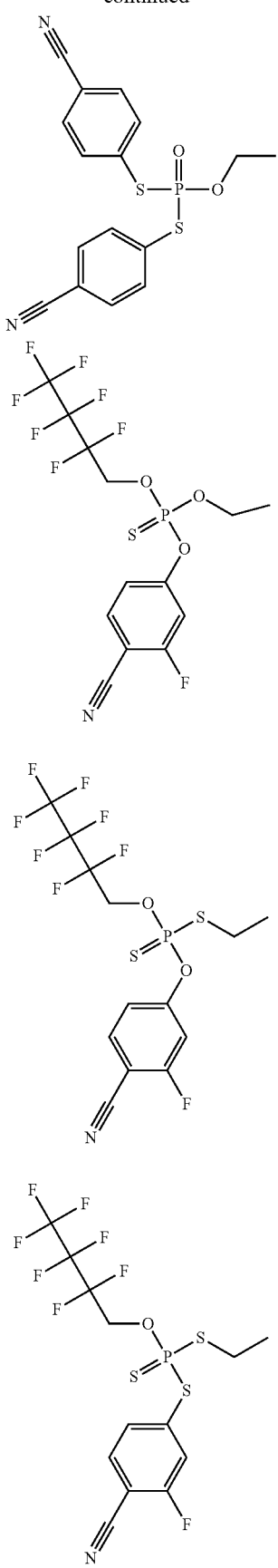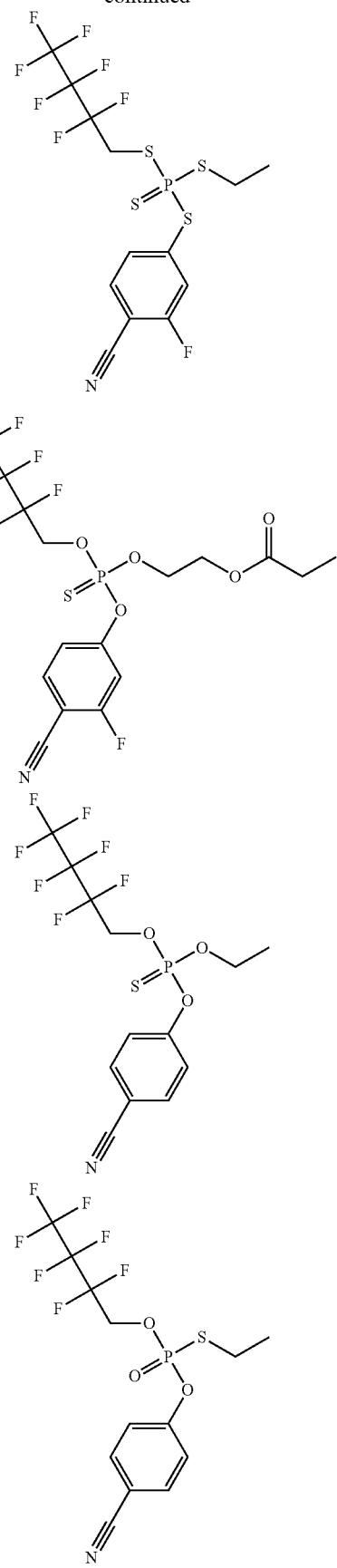

-continued

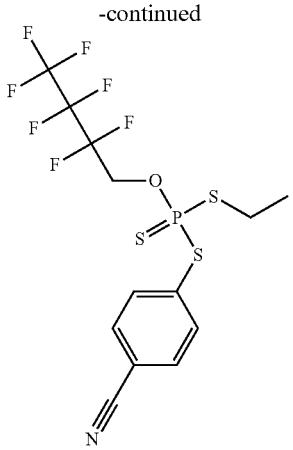

Further, the disclosure will illustrate specific examples. These examples are only an illustration and are not meant to limit the disclosure or the claims to follow.

Example A—Synthesis of (4-cyanophenyl)3 thiophosphate

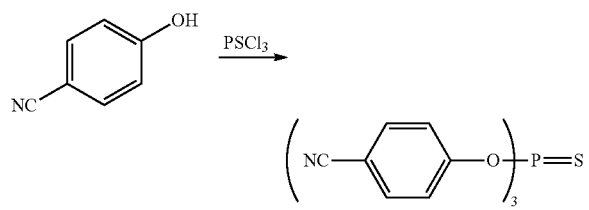

To a 250 mL 3-neck flask equipped with a magnetic stirring bar, water-cooled condenser, $N_2$ inlet and thermocouple was dissolved 4-cyanophenol in DCM (40 mL). Triethylamine was added and an exotherm to 29° C. was observed. The mixture remained clear and colorless. While stirring at RT, thiophosphorylchloride was slowly added by syringe and an exotherm to about 46° C. was observed. The mixture gradually became cloudy and a white solid (triethylamine-HCl) slowly formed. The mixture slowly returned to RT and stirred for 4 h. DI $H_2O$ (60 mL) was added and the mixture was poured into a separatory funnel. The organic phase was extracted into DCM, separated, dried over $MgSO_4$, and the solvent stripped by rotary evaporation to solid. The solid was slurried in 100% hexane and collected by vacuum filtration. The solid was slurried in 100% IPA (2×20 mL) and collected by vacuum filtration and dried by vacuum oven (5 mbar, 60° C.). Yield: white solid, 11.2 g (97%).

FTIR: 2228, 1597, 1494, 1193, 930 $cm^{-1}$; MP: 162.0-163.5° C.

$H^+$ NMR: ($CDCl_3$) δ ppm 7.74 (d, 2H), 7.35 (d, 2H); $P^{31}$ NMR: ($CDCl_3$) δ ppm 49.81 (s, 1P).

Example B—Electrolyte Formulations for LCO-Graphite Cells

Electrolyte formulations were prepared in a dry argon filled glovebox by combining all the electrolyte components in a glass vial and stirring for 24 hours to ensure complete dissolution of the salts. The nitrile-substituted thiophosphate additive material is added to a base electrolyte formulation comprising a 3:7 by weight mixture of ethylene carbonate, "EC", and ethyl methyl carbonate, "EMC", and 1 M lithium hexafluorophosphate, "$LiPF_6$", as a $Li^+$ ion conducting salt, dissolved therein. All electrolytes have 2 weight % of vinylene carbonate "VC" as the standard negative electrode SEI forming additive. Comparative Examples 1 through 3 (CE) include commercially available nitrile-based additives, and Embodiment Example 1 (EE1) is a representative example molecule as per the present disclosure. The electrolyte formulations prepared are summarized in Table A.

TABLE A

| Electrolyte Formulations | |
|---|---|
| Electrolyte | Nitrile based additive (0.5 weight %) |
| Comparative Example 1 | NONE |
| Comparative Example 2 | (4-cyanophenyl)3 phosphate |
| Comparative Example 3 | 1,3,6 Hexanetricarbonitrile |
| Embodiment Example 1 | (4-cyanophenyl)3 thiophosphate |

| Reagent | MW | Equiv | Mol | Mass (g) | Density | Volume (mL) | Conc | Yield (calc) |
|---|---|---|---|---|---|---|---|---|
| 4-cyanophenol | 119.12 | 1.00 | 0.084 | 10.0 | | #DIV/0! | | |
| PSCl3 | 169.40 | 0.33 | 0.028 | 4.7 | 1.668 | 2.8 | | |
| DCM | | | | 49.0 | 1.326 | 36.9 | 30% | |
| triethylamine | 101.19 | 1.00 | 0.084 | 8.5 | 0.726 | 11.7 | | |
| (4-cyanophenyl)3-thiophosphate | 417.26 | 1.00 | | | | | | 11.6 |
| triethylamine-HCl | 137.65 | 1.00 | 0.084 | | | | | 11.6 |

Example C—LCO-Graphite Cells

The electrolyte formulations prepared are used as electrolytes in 4.8 Ah Li-ion pouch cells including Lithium cobalt oxide cathode active material, "LCO", and graphite as the anode active material. The gravimetric and volumetric energy density values for these cells were 212 Wh/kg and 457 Wh/L, respectively. In each cell, 15 g (— 3 g/Ah) of electrolyte formulation was added and allowed to soak in the cell for 1 hour. The cells are vacuum sealed, and primary charged before wetting at 45° C. for 24 hours. After equilibrating the cells at room temperature, the cells were then charged to 3.8 V at C/25 rate before degassing, followed by vacuum sealing. After degassing, the cells were charged and discharged twice between 4.45 to 3.0 V at C/10 rate, and the results are summarized in Table B. The Initial Capacity Loss (iCL) is calculated based on the first cycle coulombic efficiency and the reported Discharge Capacity is for the last cycle of formation. AC-IR is the measured internal resistance at 1 kHz frequency. It is evident that the addition of 0.5 wt. % nitrile-based additives does not change the iCL, discharge capacity values and AC-IR for cells. However, the dQ/dV profiles in FIG. 1 are indicative of a different unique SEI layer on the anode surface compared to Comparative examples. EE1 demonstrates a unique peak at 2.7 V, related to the decomposition of the EE1 additive on the anode surface before the reaction of VC additive in reference electrolyte during the initial charge. The higher iCL for cells with Embodiment Example 1 (EE1) can also be co-related to the sharp reaction peak seen in the dQ/dV profile of the electrolyte.

TABLE B

Initial Cell Data

| Electrolyte | Initial Capacity Loss (%) | Discharge Capacity (Ah) | AC-IR (mΩ) |
|---|---|---|---|
| CE1 | 8.9 | 5.03 | 3.49 |
| CE2 | 9.2 | 5.00 | 3.51 |
| CE3 | 8.9 | 5.03 | 3.43 |
| EE1 | 9.3 | 5.04 | 3.51 |

Figure 2:
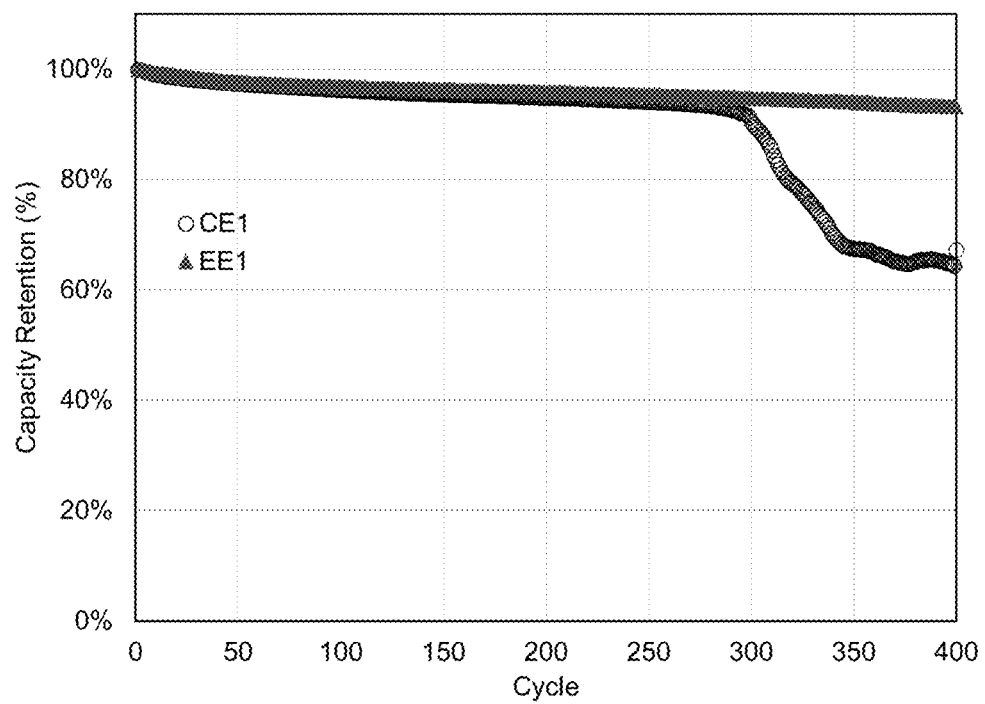
FIG. 2 shows the cycle life characteristics of the 4.8 Ah LCO-Graphite cells in accordance with the present disclosure.

The cells were then charged and discharged four hundred times between 4.45 to 3.0 V at 45° C. The charge current was set to C/2 and the discharge current 1C. FIG. 2 shows the cycle life characteristics of the 4.8 Ah LCO-Graphite cells. Here, it is clear that addition of a nitrile-substituted thiophosphate additive greatly improves the cyclability of LCO-Graphite cells relative to the comparative example. The capacity retention after 400 cycles is higher for cells with EE1 compared to CE1. This data is summarized in Table C.

TABLE C

Data after 400 Cycles in LCO-Graphite cells

| Electrolyte | Initial Capacity (Ah) | Retention (%) at 400 cycles |
|---|---|---|
| CE1 | 5.03 | 67.3 |
| EE1 | 5.04 | 91.3 |

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed is:

1. An electrochemical energy storage device electrolyte comprising:
   a) an aprotic organic solvent system;
   b) a metal salt; and
   c) at least one thiophosphate additive having a nitrile terminal group, according to the formula:

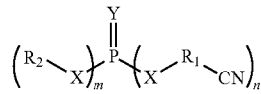

wherein:
Y is oxygen or sulfur;
X is independently oxygen or sulfur, with the proviso that if Y is oxygen then at least one X is sulfur;
m and n are either 0, 1, 2 or 3; but m and n must sum equal to 3;
$R_1$ and $R_2$ are independently a $C_1$-$C_{10}$ substituted or unsubstituted alkyl group, or aryl group; wherein the hydrogen atoms can be unsubstituted or can be a halogen, alkyl, alkoxy, perfluorinated alkyl, silyl, siloxy, silane, sulfoxide, amide, azo, ether, and thio-ether group or combinations thereof.

2. The electrolyte of claim 1, wherein the at least one thiophosphate additive having a nitrile terminal group is present in a concentration of from 0.001 wt. % to 25 wt. % in the electrolyte.

3. The electrolyte of claim 1, wherein the aprotic organic solvent system comprises an open-chain or cyclic carbonate, carboxylic acid ester, nitrite, ether, sulfone, ketone, lactone, dioxolane, glyme, crown ether, siloxane, phosphoric acid ester, phosphite, mono- or polyphosphazene or mixtures thereof.

4. The electrolyte of claim 1, wherein the aprotic organic solvent system is present in a concentration of from 60 wt. % to 90 wt. % in the electrolyte.

5. The electrolyte of claim 1, wherein the cation of the metal salt is an alkali metal.

6. The electrolyte of claim 5, wherein the alkali metal is lithium or sodium.

7. The electrolyte of claim 1, wherein the cation of the metal salt is aluminum or magnesium.

8. The electrolyte of claim 1, wherein the metal salt is present in a concentration of from 10 wt. % to 30 wt. % in the electrolyte.

9. The electrolyte of claim 1, further comprising at least one second additive.

10. The electrolyte of claim 9, wherein the at least one second additive comprises a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or the mixtures thereof.

11. The electrolyte of claim 9, wherein the at least one second additive comprises a partially or fully halogenated phosphoric acid ester compound, an ionic liquid, or mixtures thereof.

12. The electrolyte of claim 11, wherein the halogenated phosphoric acid ester compound is selected from the group consisting of 4-fluorophenyldiphenylphosphate, 3,5-difluorophenyldiphenylphosphate, 4-chlorophenyldiphenylphosphate, trifluorophenylphoshate, heptafluorobutyldiphenylphosphate, trifluoroethyldiphenylphosphate, bis(trifluoroethyl)phenylphosphate, and phenylbis(trifluoroethyl)phosphate.

13. The electrolyte of claim 1, wherein the ionic liquid is selected from the group consisting of tris(N-ethyl-N-methylpyrrolidinium)thiophosphate bis(trifluoromethylsulfonyl)imide, tris(N-ethyl-N-methylpyrrolidinium) phosphate bis(trifluoromethylsulfonyl)imide, tri s(N-ethyl-N-methylpiperidinium)thiophosphate bis(trifluoromethylsulfonyl)imide, and tris(N-ethyl-N-methylpiperidinium) phosphate bis(trifluoromethyl sulfonyl)imide.

14. The electrolyte of claim 9, wherein the at least one second additive is present in a concentration of from 0.01 wt. % to 10 wt. % in the electrolyte.

15. An electrochemical energy storage device comprising:
a cathode;
an anode;
an electrolyte according to claim 1; and
a separator.

16. The device of claim 15, wherein the cathode comprises a lithium metal oxide, spinel, olivine, carbon-coated olivine, vanadium oxide, lithium peroxide, sulfur, polysulfide, a lithium carbon monofluoride or mixtures of any two or more thereof.

17. The device of claim 16, wherein the lithium metal oxide is $LiFePO_4$, $LiCoO_2$, $LiNiO_2$, $LiNi_xCo_yMet_zO_2$, $LiMn_{0.5}Ni_{0.5}O_2$, $LiMn_{0.1}Co_{0.8}O_2$, $LiMn_{0.2}Co_{0.2}Ni_{0.6}O_2$, $LiMn_{0.3}Co_{0.2}Ni_{0.5}O_2$, $LiMn_{0.33}Co_{0.33}Ni_{0.33}O_2$, $LiMn_2O_4$, $LiFeO_2$, $Li_{1+x}Ni_\alpha Mn_\beta Co_\gamma Met'_\delta O_{2-z'}F_{z'}$, $A_nB_2(XO_4)_3$ (NASICON), wherein Met is Al, Mg, Ti, B, Ga, Si, Mn or Co; Met' is Mg, Zn, Al, Ga, B, Zr or Ti; A is Li, Ag, Cu, Na, Mn, Fe, Co, Ni, Cu or Zn; B is Ti, V, Cr, Fe or Zr; X is P, S, Si, W or Mo; and wherein $0 \leq x \leq 0.3$, $0 \leq y \leq 0.5$, $0 \leq z \leq 0.5$, $0 \leq x' \leq 0.4$, $0 \leq \alpha \leq 1$, $0 \leq \beta \leq 1$, $0 \leq \gamma \leq 1$, $0 \leq \delta \leq 0.4$, $0 \leq z' \leq 0.4$ and $0 \leq h' \leq 3$.

18. The device of claim 15, wherein the anode comprises lithium metal, graphitic material, amorphous carbon, $Li_4Ti_5O_{12}$, tin alloy, silicon, silicon alloy, intermetallic compound or mixtures thereof.

19. The device of claim 18, wherein the anode is a composite anode comprising active material particles of silicon or silicon alloys; and a conductive polymer coating around the active material particles.

20. The device of claim 19, wherein the conductive polymer is polyacrylonitrile (PAN).

21. The device of claim 15, wherein the device comprises a lithium battery, lithium-ion battery, lithium-sulfur battery, lithium-air battery, sodium ion battery, magnesium battery, lithium/$MnO_2$ battery, or Li/poly(carbon monofluoride) battery.

22. The device of claim 15, wherein the device comprises a capacitor or solar cell.

23. The device of claim 15, wherein the device comprises an electrochemical cell.

24. The device of claim 15, wherein the separator comprises a porous separator separating the anode and cathode from each other.

25. The device of claim 24, wherein the porous separator comprises an electron beam-treated micro-porous polyolefin separator or a microporous polymer film comprising nylon, cellulose, nitrocellulose, polysulfone, polyacrylonitrile, polyvinylidene fluoride, polypropylene, polyethylene, polybutene, or co-polymers or blends of any two or more such polymers.

26. The device of claim 15, wherein the aprotic organic solvent system comprises an open-chain or cyclic carbonate, carboxylic acid ester, nitrite, ether, sulfone, ketone, lactone, dioxolane, glyme, crown ether, siloxane, phosphoric acid ester, phosphite, mono- or polyphosphazene or mixtures thereof.

27. The device of claim 15, wherein the aprotic organic solvent system is present in a concentration of from 60 wt. % to 90 wt. % in the electrolyte.

28. The device of claim 15, wherein the cation of the metal salt is an alkali metal.

29. The device of claim 28, wherein the alkali metal is lithium or sodium.

30. The device of claim 15, wherein the cation of the metal salt is aluminum or magnesium.

31. The device of claim 15, wherein the metal salt is present in a concentration of from 10 wt. % to 30 wt. % in the electrolyte.

32. The device of claim 15, wherein the electrolyte further comprises at least one second additive.

33. The device of claim 32, wherein the at least one second additive comprises a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or the mixtures thereof.

34. The device of claim 33, wherein the at least one second additive is present in a concentration of from 0.01 wt. % to 10 wt. % in the electrolyte.

* * * * *